H. E. HOOVER.
CLEANER.
APPLICATION FILED OCT. 8, 1917.
1,328,737.  Patented Jan. 20, 1920.
4 SHEETS—SHEET 4.
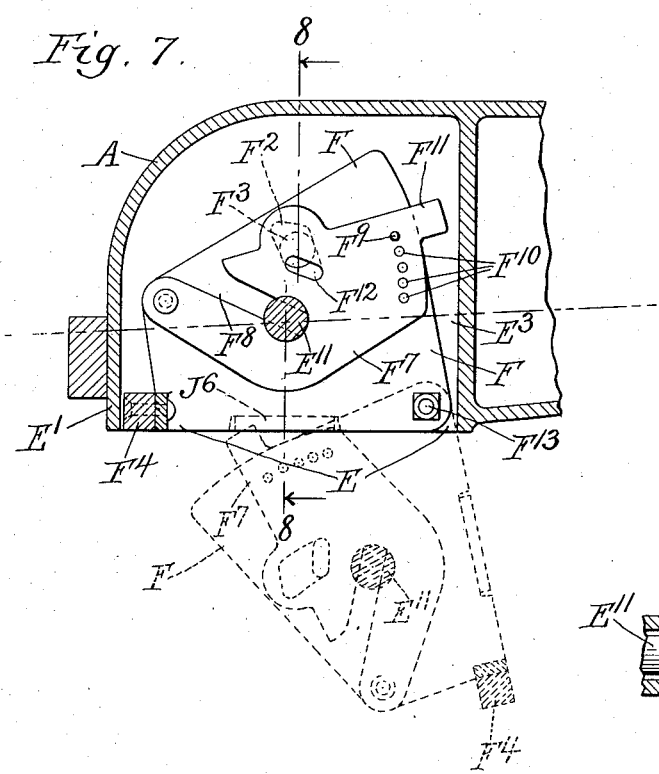
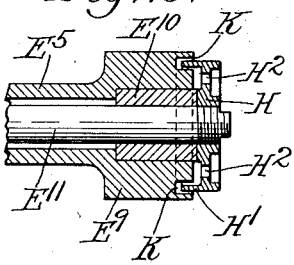
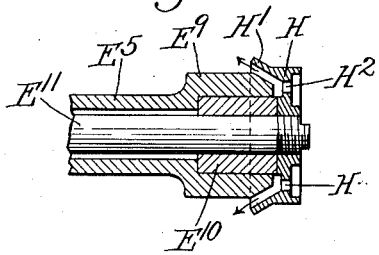
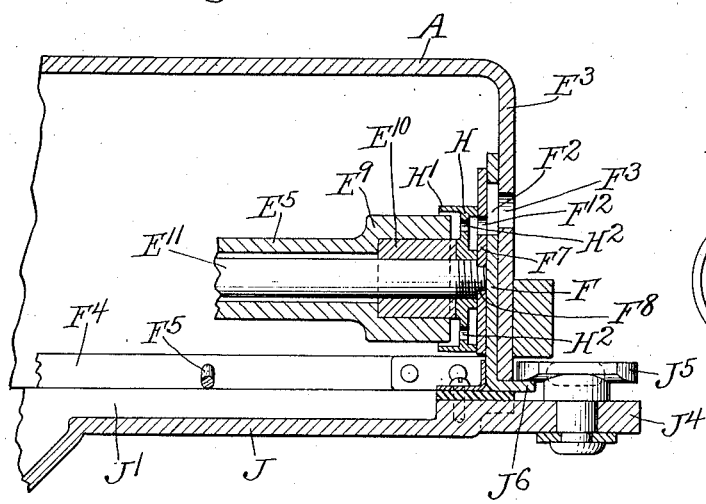
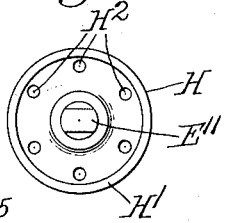
Witness.
Edward T. Wray.
Inventor.
Howard Earl Hoover
by Parker & Carter
Attorneys.

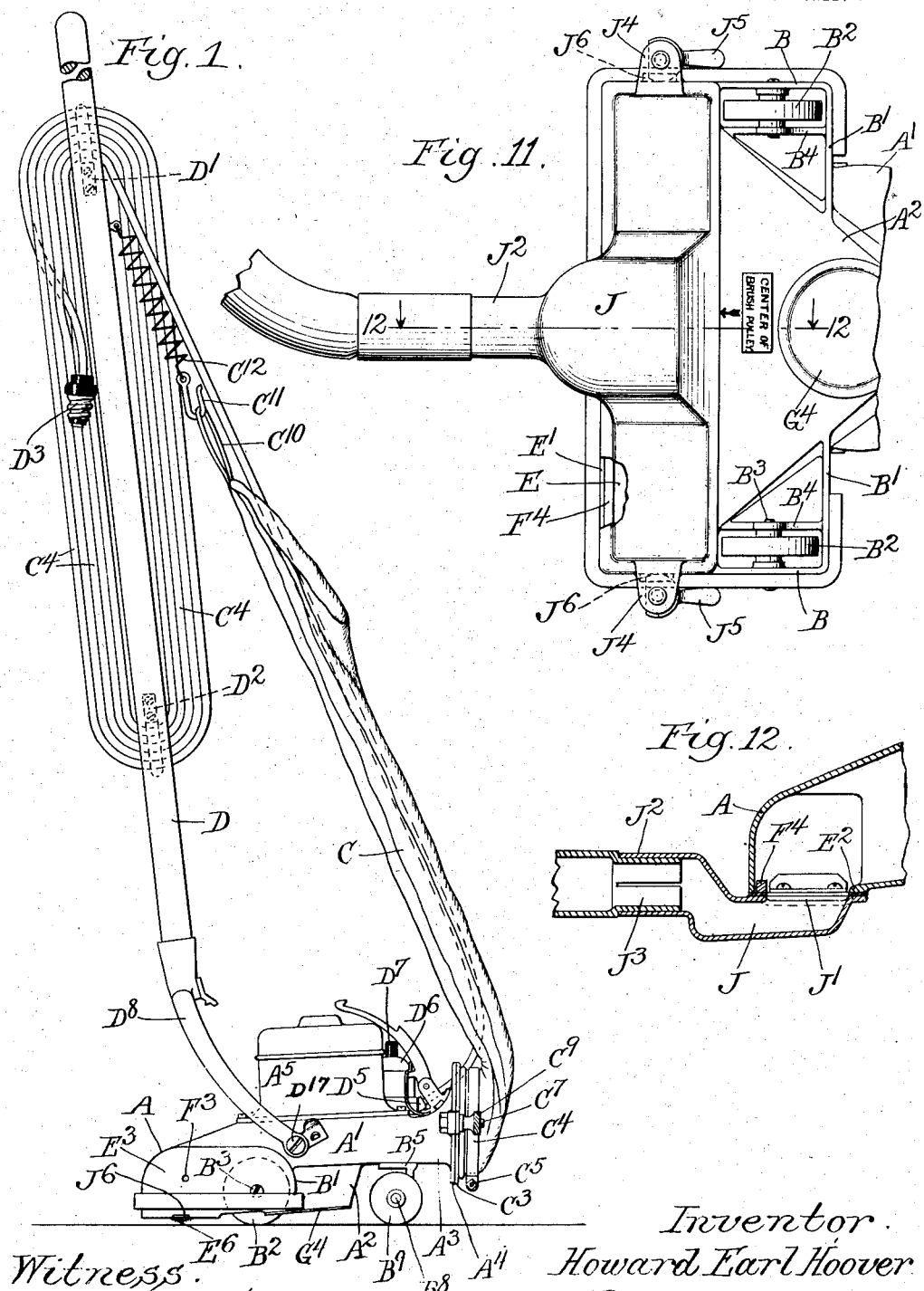

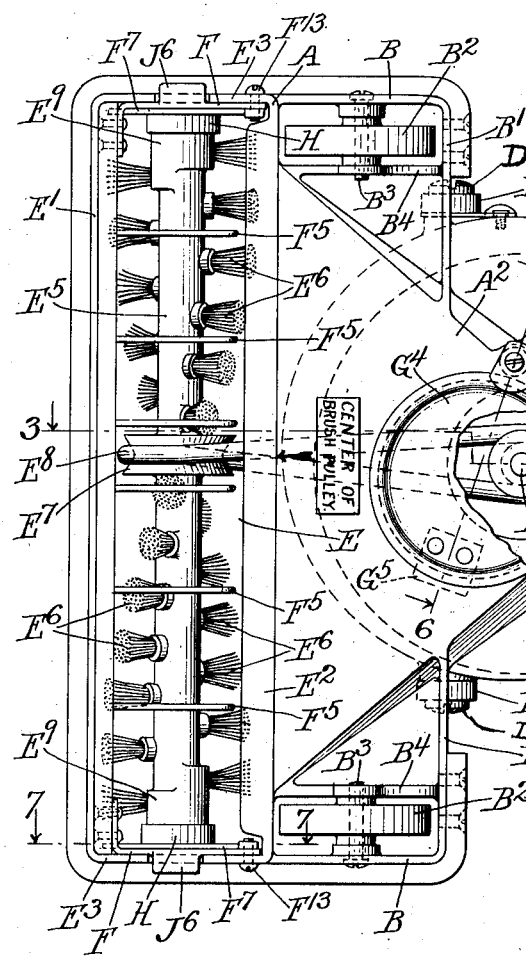
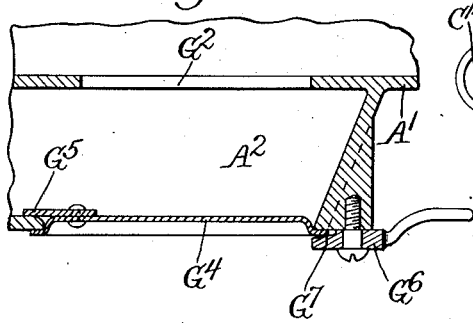
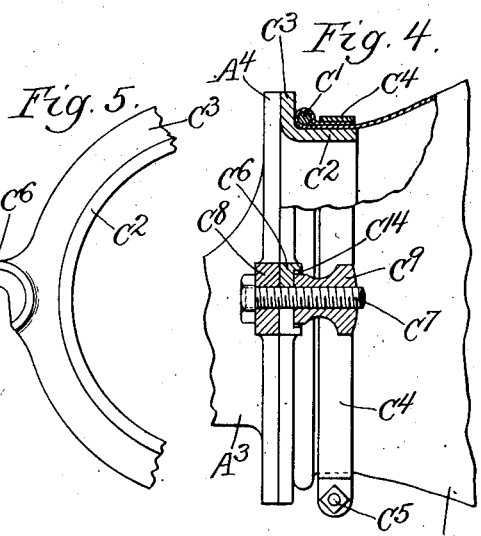

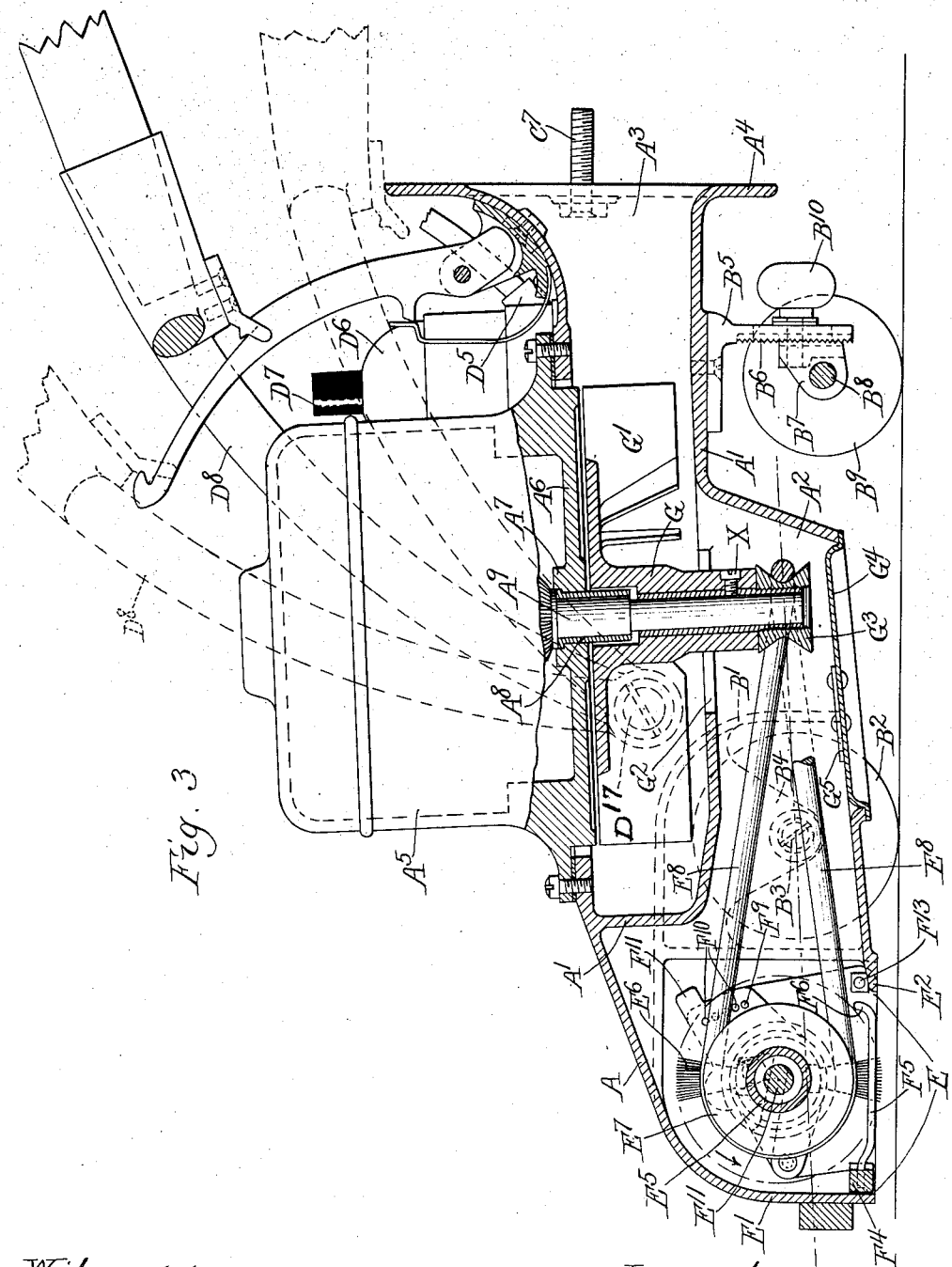

UNITED STATES PATENT OFFICE.

HOWARD EARL HOOVER, OF CHICAGO, ILLINOIS, ASSIGNOR TO THE HOOVER SUCTION SWEEPER COMPANY, OF NEW BERLIN, OHIO, A CORPORATION OF OHIO.

CLEANER.

1,328,737.　　　　　Specification of Letters Patent.　　Patented Jan. 20, 1920.

Application filed October 8, 1917. Serial No. 195,231.

*To all whom it may concern:*

Be it known that I, HOWARD EARL HOOVER, a citizen of the United States, residing at Chicago, in the county of Cook and State of Illinois, have invented a certain new and useful Improvement in Cleaners, of which the following is a specification.

My invention relates to improvements in vacuum cleaners. It is illustrated more or less diagrammatically in the accompanying drawings, wherein Figure 1 is a side view of the cleaner, Fig. 2 is an inverted plan view with parts broken away;

Fig. 3 is a detail side elevation on an enlarged scale in part section along the line 3—3 of Fig. 2;

Fig. 4 is a detail section along the line 4—4 of Fig. 2;

Fig. 5 is a detail of the dirt bag securing ring;

Fig. 6 is a detail section along the line 6—6 of Fig. 2;

Fig. 7 is a detail section along the line 7—7 of Fig. 2;

Fig. 8 is a section along the line 8—8 of Fig. 7;

Fig. 9 is an end view of the brush roll guard;

Fig. 10 is a detail section of one end of a modified form of brush roll;

Fig. 11 is a detail inverted plan view showing a closure attached to the nozzle;

Fig. 12 is a detail section along the line 12—12 of Fig. 11;

Fig. 13 is a detail of a modification of the guard and brush end.

Like parts are indicated by like characters in all the figures.

A is a nozzle housing. In my preferred form it is cast integral with the fan housing $A^1$, and it is operatively connected to such fan housing by a conduit $A^2$. $A^3$ is a material discharge passage or channel communicating with the interior of the fan housing. It terminates in a broad extended flange $A^4$ substantially at right angles to the axis of the channel or passage. $A^5$ is a motor housing mounted upon the fan housing $A^1$. This housing contains a motor not here illustrated since it forms no part of my invention. The wall $A^6$ separates the motor housing from the fan chamber, and forms the upper boundary of the fan chamber. It is provided with a centrally disposed boss $A^7$ containing a bearing sleeve $A^8$ in which is rotatably mounted the motor shaft $A^9$, which shaft extends downwardly through the fan casing or housing into the interior of the channel $A^2$, substantially in line with the central portion of the nozzle.

The fan housing $A^1$ overhangs at both sides on the rear as shown at B. This overhang, together with the downward depending walls as indicated at $B^1$ forms on either side of the machine a substantially triangular chamber, which chamber serves as a housing for the supporting wheels or rollers $B^2$, which wheels or rollers are supported on shafts $B^3$ carried at one end in the outer overhanging wall at the other end in a partition or lug $B^4$ inside the chamber. It will be understood that the chamber containing these two rollers or wheels is while in the same casting, altogether separate from the nozzle itself. $B^5$ is a bracket downwardly projecting from the bottom of the fan chamber and the passage $A^3$. This bracket has a corrugated front side $B^6$. $B^7$ is a journal block corrugated to engage the corrugated side $B^6$. It carries an axle $B^8$ upon which are mounted the wheels $B^9$, $B^9$. The journal block is held against the bracket by a thumb screw $B^{10}$ and so may be adjusted in position at the will of the operator.

C is the dirt bag. Its open mouth is provided with a circular ring $C^1$, surrounding the flange $C^2$, of a collar $C^3$. $C^4$ is a clamping ring surrounding the bag just inside the ring $C^1$ and adapted to clamp it upon the collar $C^2$, the clamping ring being tightened by the nut and bolt $C^5$. The flange $C^3$ is adapted to rest against and make a snug contact with the flange $A^4$. $C^6$ $C^6$ are hooks diametrically opposed on the flange $C^3$ adapted to hook over and rest upon the studs $C^7$ $C^7$, which studs are carried in lugs $C^8$ $C^8$ on opposed sides of the flange $A^4$. $C^9$ $C^9$ are thumb nuts screw-threaded on the studs $C^7$, whereby the two flanges may be clamped close together to make a firm continuous contact and close the gap between the open end of the bag and the discharge passage. $C^{10}$ is a loop attached to the upper end of the bag, so that its upper end may be suspended when in operation from the hook $C^{11}$ on the spring or other yielding support $C^{12}$, which support is anchored at its other end upon the vacuum cleaner handle.

D is the cleaner handle. It supports adjacent its upper end the spring $C^{12}$ to hold and support the bag. $D^1$, $D^2$ are clips about which the electric wire or conduit may be wound on the handle when the device is not in operation. $D^3$ is a contact plug on one end of the conduit $C^4$, the other end of the conduit being supported on the handle D and terminating as shown at $D^5$ in the switch housing $D^6$, which housing is provided with a push button control $D^7$, whereby the motor may be stopped and started at the will of the operator. $D^8$ is a handle bail upon which is mounted the handle D. The two prongs or forks of the handle bail are as shown pivoted one on either side of the fan housing $A^1$ being mounted on the screw studs $D^{17}$.

The lower portion of the motor shaft $A^9$ is reduced smaller than the part mounted in the sleeve $A^8$, and it carries the hub G of a fan $G^1$. This fan is located in the fan housing or chamber. The hub G extends down through the port $G^2$ into the chamber communicating with the nozzle and at the extreme end of the shaft is a grooved pulley $G^3$ screw-threaded on the shaft. The set screw X holds the hub G in position on the shaft. Access may be had to this pulley hub and shaft through the bottom of the housing $A^2$ by means of a hand hole closed by a plate $G^4$. This plate is flanged as indicated and has at one side on the inside a locking strip $G^5$ overlying the bottom of the chamber. Diametrically opposed is a locking lever $G^6$ pivoted on the wall of the chamber, having a cam surface $G^7$ to engage the flange and lock the plate in position.

E is a wide rectangular slot in the lower side of the nozzle housing A arranged along its front edge. It is bounded at the front by the downwardly depending wall $E^1$ substantially normal to the floor level, at the rear by an inwardly extending lip $E^2$ substantially on the same horizontal plane as the lower edge of the wall $E^2$. At its end it is bounded by the walls $E^3$, $E^3$. The rear side of the inner portion of the nozzle of course communicates with the fan chamber by means of the tapered passage as shown located within the housing $A^1$, the dividing line between the nozzle and the passage being an imaginary plane drawn through the lip $E^2$ substantially vertical to the horizontal when the machine is in the ordinary operating position. Within the nozzle E is a brush. The brush consists of a hollow tube $E^5$, carrying separated spaced bristle brushes $E^6$ projecting radially therefrom and arranged in spiral lines about the periphery thereof. $E^7$ is a driving pulley on the brush and integral therewith. $E^8$ is a driving belt passing over the pulleys $E^7$ and $G^3$ to drive the brush in response to the rotation of the motor shaft. The hollow brush shaft $E^5$ is enlarged at either end as indicated at $E^9$, and these enlarged ends contain the bushings $E^{10}$ of wood or other suitable material. It is these bushings that form the supporting bearings for the brush, and they ride or rotate upon the fixed shaft $E^{11}$.

F, F are end plates pivoted at their lower rear corners by pivot pins $F^{13}$ on the inner sides of the walls $E^3$. They are apertured at $F^2$ and adapted when in the operating position to be in register with the apertures $F^3$ in the walls $E^3$. These plates are tied together at their lower forward corners by the tie bar $F^4$. This tie bar is adapted to fit snugly against the inner lower side or the forward wall of the nozzle and it carries a series of rearwardly extending guide fingers $F^5$, which fingers extend substantially across the width of the nozzle beneath the brush. They are bent upwardly at their rear ends as at $F^6$ so as to provide a narrow unobstructed passage or channel between their upwardly curved ends and the forward edge of the lip $E^2$. $F^7$, $F^7$ are adjusting or brush carrying plates. They are pivoted at their forward corners upon the plates F. They are slotted as at $F^8$ to engage the flattened ends of the shaft or rod $E^{11}$, which is held in such slots against rotation. $F^9$, $F^9$ are pins projecting outwardly from the plates F to engage perforations $F^{10}$ in the adjusting plates $F^7$. $F^{11}$ are handles projecting outwardly from the adjusting plates whereby they may be swung or bent up to clear the ends of the pins so that the plates may be rotated or adjusted to bring the pins into engagement with any of the apertures selectively, thus to change the height of the brush in the nozzle. $F^{12}$, $F^{12}$ are apertures in the plates $F^7$ in register at all times with the apertures $F^2$ in the plates F.

H, H are washers or cupped disks screw-threaded on the ends of the shaft $E^{11}$ and adapted to limit the longitudinal movement of the brush. These disks are provided with annular cylindrical flanges $H^1$, $H^1$ and are apertured or perforated about their peripheries as at $H^2$. These flanges rest against the plates $F^7$ on one side to form an annular air passage through which a current of air may pass from the apertures $F^{12}$ to and through any one of the perforations $H^2$. These flanges on the inner side overlie the ends of the enlarged portion of the hollow brush shaft $E^9$. This enlarged portion in a modified form is beveled or cut away at the ends as indicated so that the extreme end of the brush portion is in shape a truncated cone.

The guard frame which protects the brush and prevents the carpet from being drawn too deep within the mouth of the nozzle, is formed of the parts above described which are hinged or pivoted inside the nozzle, and which coöperate to carry the brush and the fingers which form the effective part of the guard frame.

It will be noted that the axis of rotation of the motor and fan is substantially vertical and that the relative position of the driving pulley on the brush is such that the plane of the driving pulley falls always below the axis of rotation of the brush, this tending in coöperation with the direction of rotation of the brush as shown by the arrows, to keep the belt always on the pulleys without difficulty and without danger of tipping or it running off. It will be noted also that the brush rotates so as to tend to throw any material which it catches from the surface of the carpet, into the machine in the same direction as it would normally be drawn by the air draft.

It will be noted that the body of the machine is exceedingly low and hugs close to the floor so that the center of gravity is low and so there is small danger of tipping and also the machine may be run under chairs, tables, desks and the like. The bottom of the fan is substantially parallel with the floor of the fan casing, also with the roof thereof so that there is a minimum loss by leakage around the fan. The floor of the conduit leading from the nozzle to the fan chamber is slightly inclined so as to provide clearance, thus the nozzle itself is the only fixed part which approaches close to the floor.

It will be evident that while I have shown in my drawings an operative device, still many changes might be made both in size, shape and arrangement of parts without departing materially from the spirit of my invention. I wish, therefore, that my drawings be regarded as in a sense diagrammatic.

The space or area or particularly the annular space about the bearing or associated parts or the entrance to the bearing or associated parts through which fouling substances must pass I have called the danger zone. The tendency of the material to pass through that zone to the bearing or associated parts may be due to various causes, among others to the vibration of the surfaces or centrifugal motion or the movement of currents of air induced by the shape of the parts or their movement. The means which I have provided direct a counter current of air through such danger zone and effectually prevent the deposition or attachment of any such material about the end of the bearing or associated parts because of the fact that such materials can not pass through this danger zone, being constantly and automatically excluded therefrom by such air current.

It is to be noted that the brush and its bearings form a rigidly tied together unit and that unit may be mounted in the relatively flexible and thin suction hood as a unit.

The shaft which ties the bearings together is inside the brush. It is more or less rigid and stiffens the assembly in suchwise that even if the two ends of the shaft were supported upon the walls of the hood should be moved by warping or bending of the hood, still the alinement of the bearings and brush will not be affected. Thus the brush may turn at its normal speed at all times without binding or distortion.

Referring to Figs. 11 and 12, and particularly to so much thereof as relates to the converter, that is to the apparatus whereby the mouth is closed and a hose connection made, J is a pan having an open mouth at $J^1$ and an outlet $J^2$ adapted to receive a pipe connection $J^3$ whence leads the hose to the other end of which may be attached any suitable cleaning tool. Laterally projecting from the pan are the ears $J^4$, $J^4$ to which are pivotally connected the lock levers $J^5$, $J^5$ each having a handle at one end and at the other a portion adapted to overlie a lip or lug $J^6$ of Fig. 8 which projects from or is attached to or forms part of the end plates F. Such a lip could be formed on the side of the hood.

Referring to the structure of Fig. 13, the parts are substantially the same as in all the other figures except that the end of the brush device is provided with a channel K of any desired shape and position into which is received the margin of the cup-shaped guard. This is for cases where the air current is reduced to a minimum or dispensed with, the preferable form, and experience may show that it is the preferred form for all cases.

By reference to Fig. 3 it will be seen that the plane indicated by dotted lines which is perpendicular to the axis of the motor and fan lies below the axis of the brush and by reference to Fig. 2 it will be seen that the pulley on the brush is a little at one side of the vertical plane which passes through the axis of the fan and motor and is substantially at right angles to the axis of the brush. The result of this displacement of the brush and its pulley is to cause the belt to seat on the pulleys and to prevent it from twisting or turning on its own axis. This arrangement also tends to hold the brush within the nozzle.

The use and operation of the invention will be evident from what has been said in connection with the description of the several parts. However, it may be proper to point out that the brush ends are protected by the guard or cup projecting into the channel and the current of air passing therethrough, that the frame which holds the brush is pivoted so as to be swung in and out of the hood, that the position of the driving belt tends to yieldingly hold the frame and its several parts in position in the hood because the belt is located above the pivot line of the frame, or is in whole or part above that plane which is at right angles to the driving pulley shaft, that the frame is locked in position by the mechanism shown, that the brush is easily adjusted on the frame and locked in its position by the device as illustrated, that is, the two pivoted plates, and that the fingers are shorter than the width of the opening in which they are placed so as to leave a free vertical space between the ends of the fingers and the edge of the opening.

I claim:

1. In a suction cleaner a hood in combination with a brush frame which it incloses and a brush adjustably mounted in said frame said frame pivotally mounted so that it can swing outside of the hood.

2. In a suction cleaner the combination with a suction cleaner hood of a brush support comprising two supporting plates pivoted one on each end wall of the hood, a supporting and connecting member attached to the lower forward corner of each of said plates adapted normally to lie immediately behind the lower edge of the front wall of the hood, an adjusting plate upon which the end of the brush is mounted, pivoted upon each supporting plate, and locking means for adjustably positioning the brush.

3. In a suction cleaner the combination with a suction cleaner hood of a brush support comprising two supporting plates pivoted one on each end wall of the hood, a supporting and connecting member attached to the lower forward corner of each of said plates adapted normally to lie immediately behind the lower edge of the front wall of the hood, an adjusting plate upon which the end of the brush is mounted, pivoted upon each supporting plate, and locking means for adjustably positioning the brush, said locking means comprising perforations in one plate and a pin in the other, said perforations being arranged substantially concentric with the path of the plate as it moves about its pivot point.

4. In a suction cleaner the combination with a suction cleaner hood of a brush support comprising two supporting plates pivoted one on each end wall of the hood, a supporting and connecting member attached to the lower forward corner of each of said plates adapted normally to lie immediately behind the lower edge of the front wall of the hood, an adjusting plate upon which the end of the brush is mounted, pivoted upon each supporting plate and locking means for adjustably positioning the brush said locking means comprising perforations in one plate and a pin in the other, said perforations being arranged substantially concentric with the path of the plate as it moves about its pivot point, and means comprising a finger projecting from such brush plate whereby it may be manipulated.

5. In a suction cleaner the combination with a suction cleaner hood of a brush support comprising two supporting plates pivoted one on each end wall of the hood, a supporting and connecting member attached to the lower forward corner of each of said plates adapted normally to lie immediately behind the lower edge of the front wall of the hood, an adjusting plate pivoted upon each supporting plate upon which the end of the brush is mounted, the end walls of the hood and the plates being perforated in register one with another irrespective of the relative angular position of the supporting plates, and means connecting with said perforations for directing a current of air about the end of the brush.

6. In a suction cleaner a hood in combination with a brush frame which it incloses and a brush adjustably mounted in said frame, said frame pivotally mounted so that it can be swung outside of the hood for brush adjustment, the brush adjusting mechanism on the frame being inclosed within the hood so as to be out of reach of the operator when the frame is in the hood.

7. A brush support for suction cleaner hoods and the like comprising two plates pivoted one upon the other and means for locking them adjustably together, one of said plates being pivoted in and free to rotate out of the hood, a shaft mounted upon one plate and a brush mounted upon the shaft.

8. A brush support for suction cleaner hoods and the like comprising two plates pivoted one upon the other and means for locking them adjustably together, one of said plates being pivoted in the hood, a shaft mounted upon one plate, a brush mounted upon the shaft, and a cup-shaped guard for the end of the brush mounted upon the shaft, the hood, plates and guard being provided with perforations and means directing a current of air therethrough across the end of the brush.

9. In a suction cleaner the combination of a hood having an open mouth with a removable brush frame adapted to be supported in said hood at the mouth and a rotary brush mounted in said frame so as to be removable with the frame through the mouth from the hood, said frame pivotally mounted at one side of the mouth so that it can be swung outside the hood through the mouth to permit manipulation of the brush, said brush so mounted in the frame as to be removable therefrom only when the frame has been swung outside of the hood.

10. In a suction cleaner the combination of a hood with a brush frame pivoted therein, a brush mounted on the frame, a pulley on the brush, a driving pulley, a driving belt connecting the two pulleys located above the pivot line of the frame.

11. In a suction cleaner the combination of a hood with a brush frame pivoted therein, a brush mounted on the frame, a pulley on the brush, a driving pulley, a driving belt connecting the two pulleys located above the pivot line of the frame, the pivot line being intermediate the two pulleys.

12. In a suction cleaner the combination of a hood having a suction inlet with a brush frame pivoted in the hood so that it can swing outside of the hood, a brush mounted on the frame, a pulley on the brush, a driving pulley and a belt connecting the two pulleys.

13. In a suction cleaner an open mouth suction hood, a slotted brush frame pivotally mounted in the hood, a brush, a shaft upon which it is mounted, the ends of the shaft engaging the slots in said frame, a driving belt in operative relation with respect to the brush adapted to exert a tension on the brush to hold the brush in the bottom of the slots.

14. In a suction cleaner an open mouth suction hood, a slotted brush frame pivotally mounted in the hood, a brush, a shaft upon which it is mounted, the ends of the shaft engaging the slots in said frame, a driving belt in operative relation with respect to the brush adapted to exert a tension on the brush to hold the brush in the bottom of the slots and in position in the hood.

15. In a suction cleaner a hollow brush body, a shaft upon which it is rotatably mounted, adjusting members slotted to engage the shaft, supporting members upon which the adjusting members are mounted, said adjusting members of spring metal and thus forming means tending to yieldingly hold the adjusting members in adjusted position on the supporting members.

16. In a suction cleaner a hollow brush body, a shaft upon which it is rotatably mounted, adjusting members apertured to engage the shaft, supporting members upon which the adjusting members are mounted, an open mouth suction hood in which the brush and supporting parts are contained, the supporting members being pivoted on the end wall of said hood, said adjusting members of spring metal and thus forming means tending to yieldingly hold the adjusting members in adjusted position on the supporting members.

17. A suction cleaner having an open mouth suction hood, a hollow brush body, a shaft upon which it is rotatably mounted, adjusting members apertured to engage and support the ends of the shaft, supporting members upon which the adjusting members are pivoted, such supporting members being in turn pivoted on the housing, said adjusting members of spring metal and thus forming yielding means tending to hold the adjusting members in adjusted position on the supporting members.

18. In a suction cleaner the combination with a suction cleaner hood of a series of fingers extending rearwardly from the front wall thereof, and terminating near but out of contact with the rear wall of the hood, and a pivot support upon which such fingers are mounted.

19. In a suction cleaner the combination with a suction cleaner hood of pivoted brush supporting plates, one at either end of the hood, a tie-bar connecting them located immediately behind the lower edge of the front wall of the hood, and fingers carried by such bar and extending transversely to the mouth of the hood.

20. In a suction cleaner the combination with a suction cleaner hood of pivoted brush supporting plates, one at either end of the hood, a tie-bar connecting them located immediately behind the lower edge of the front wall of the hood, fingers carried by such bar and extending transversely to the mouth of the hood, the brush adjustable with reference to the fingers.

21. In a suction cleaner the combination with a suction cleaner hood of a series of fingers extending rearwardly from the front wall thereof, and shorter than the width of the opening and terminating near but out of contact with the rear wall of the hood, said fingers being of substantially uniform cross section lying within the hood and turned up at their inner ends.

22. In a suction cleaner the combination with a suction cleaner hood of pivoted brush supporting plates, one at either end of the hood, a tie-bar connecting them located immediately behind the lower edge of the front wall of the hood, and fingers carried by such bar and extending transversely to the mouth of the hood, said fingers terminating near but out of contact with the rear wall of the hood.

23. In a suction cleaner the combination with a suction sweeper hood of pivoted brush supporting plates, one at either end of the hood, a brush carried by them, a tie-bar connecting them located immediately behind the lower edge of the front wall of the hood, fingers carried by such bar and extending transversely to the mouth of the hood, the brush adjustable with reference to the fingers, said fingers terminating near but out of contact with the rear wall of the hood.

24. In a suction sweeper the combination of a hood having an open suction mouth of a series of fingers extending rearwardly from the forward wall of the mouth of the hood and shorter than the width of the opening and terminating short of the rear wall of the mouth, said fingers being of substantially uniform cross section lying within the hood and turned up at their inner ends.

25. In a suction sweeper the combination of a hood having an open suction mouth of a series of fingers extending rearwardly from the forward mouth of the hood and shorter than the width of the opening and terminating short of the rear wall of the mouth, said fingers being of substantially uniform cross section lying within the hood and turned up at their inner ends, a removable frame upon which such fingers are rigidly mounted.

26. In a suction sweeper the combination of a hood having an open suction mouth of a series of fingers extending rearwardly from the forward mouth of the hood and shorter than the width of the opening and terminating short of the rear wall of the mouth a removable frame upon which such fingers are rigidly mounted yielding means for holding the frame in position in the mouth.

In testimony whereof, I affix my signature in the presence of two witnesses this fifth day of October, 1917.

HOWARD EARL HOOVER.

Witnesses:
MINNIE M. LINDENAU,
MARION L. INGRAHAM.